June 19, 1956     M. KRAMCSAK, JR     2,750,619

CASTER

Original Filed March 23, 1950     2 Sheets-Sheet 1

INVENTOR

Michael Kramcsak Jr

BY Rockwell & Bartholow

ATTORNEYS

June 19, 1956 M. KRAMCSAK, JR 2,750,619
CASTER
Original Filed March 23, 1950 2 Sheets-Sheet 2
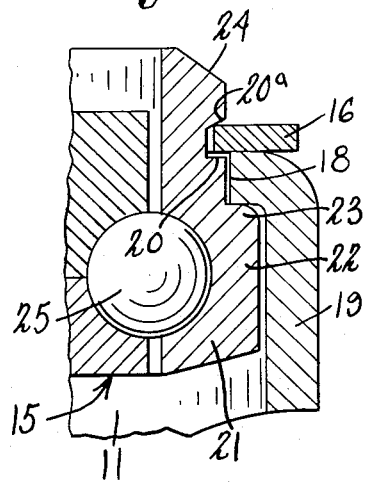
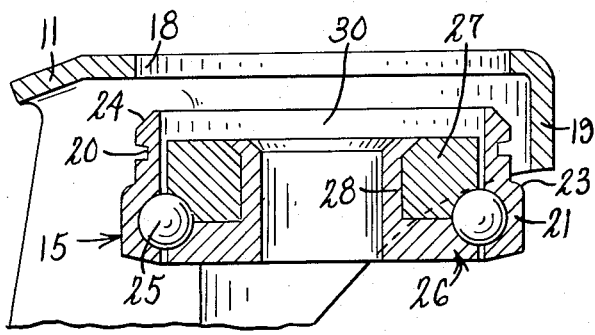
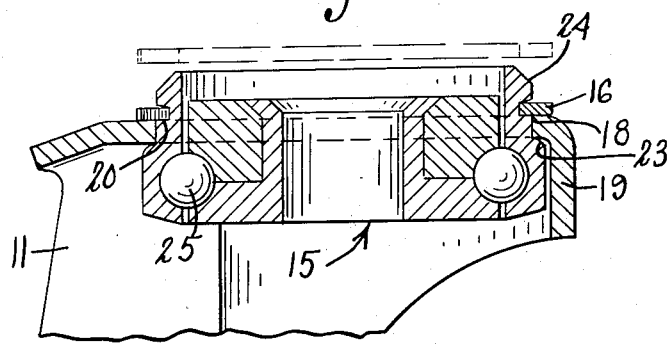
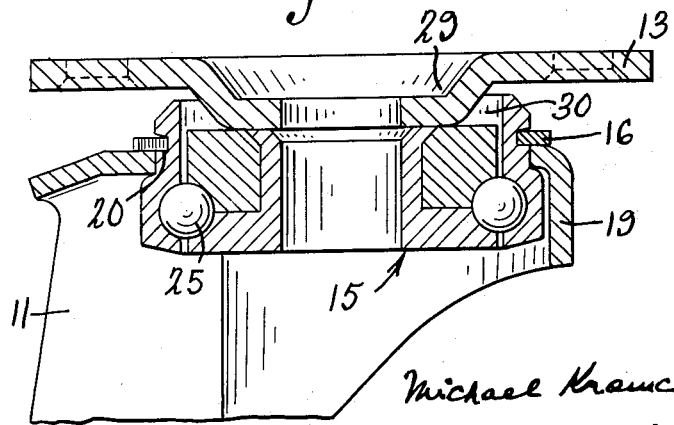
INVENTOR
Michael Kramcsak Jr.
BY Rockwell & Bartholow
ATTORNEYS

United States Patent Office 2,750,619
Patented June 19, 1956

2,750,619

CASTER

Michael Kramcsak, Jr., Bridgeport, Conn., assignor to The Bassick Company, Bridgeport, Conn., a corporation of Connecticut Continuation of abandoned application Serial No. 151,353, March 23, 1950. This application August 4, 1953, Serial No. 372,338

5 Claims. (Cl. 16—21)

This invention relates to casters, and more particularly to those of the ball-bearing swivel type in which a ball-bearing unit comprising inner and outer race members is secured to the horn of the caster for the purpose of minimizing friction when the swiveling movement takes place.

This application is a continuation of my application Serial No. 151,353, filed March 23, 1950, now abandoned.

One of the objects is to provide an improved caster of the type above mentioned.

Another object is to provide a caster in which the ball bearing which forms a part of the completed caster is precise and perfect with regard to the formation of its parts and their assembly so as to provide optimum functioning of the bearing.

Another object is to provide a caster which can be more readily assembled than previous casters of this general type.

Another object is to improve the functioning of the caster and reduce its cost.

In the accompanying drawings:

Fig. 6 is a fragmentary sectional view on a larger scale showing certain parts illustrated in Fig. 4; and Figs. 7, 8 and 9 are sectional views illustrating steps in the assembly of the caster.

Figure 1:
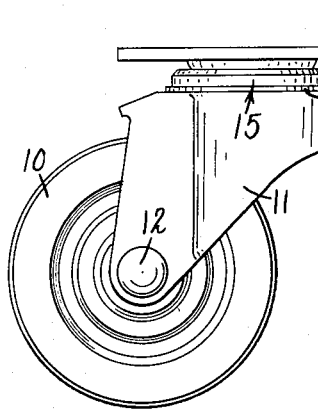
Fig. 1 is a side elevation of a caster constructed in accordance with the invention.
Figure 2:
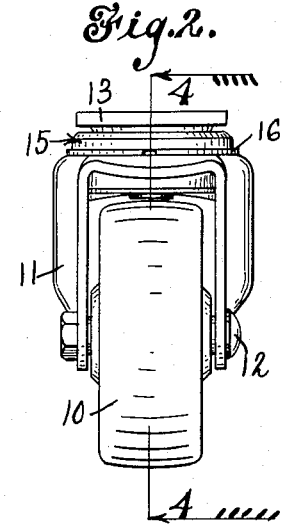
Fig. 2 is an end elevation.
Figure 3:
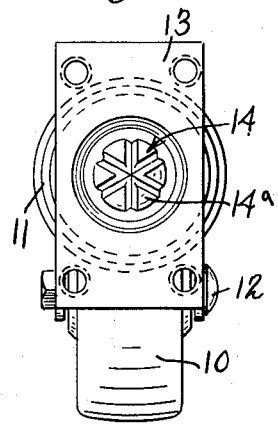
Fig. 3 is a top plan view.

The caster shown by way of example comprises a wheel rotatable upon an axle which spans the space between the lower ends of a sheet metal horn, the upper end of the horn being apertured and having fitted in the aperture a ball-bearing unit which comprises with the usual balls inner and outer race members between which the balls are placed, the inner race member being connected by a swiveling element in the form of a center pin to an attaching plate that is adapted to be attached by screws to the piece of furniture or other object.

In the drawings, the wheel is shown at 10, the horn at 11, the wheel axle at 12, the attaching plate at 13, the center pin at 14, and the ball-bearing unit at 15. The ball-bearing unit 15 is held in place in the upper end portion of the horn by means of a snap ring 16. The center pin 14 has an integral enlargement or head 17 disposed below the unit 15, and the attaching plate 13 is placed against the upper surface of the inner member of the bearing unit in the manner shown in Fig. 4 and is held in place against said inner member by staking the upper end of the center pin so as to form an upper head 14$^a$ which clamps the attaching plate tightly against the upper surface of the inner bearing member. By the described construction the ball-bearing unit and the attaching plate are securely clamped on the center pin.

Figure 4:
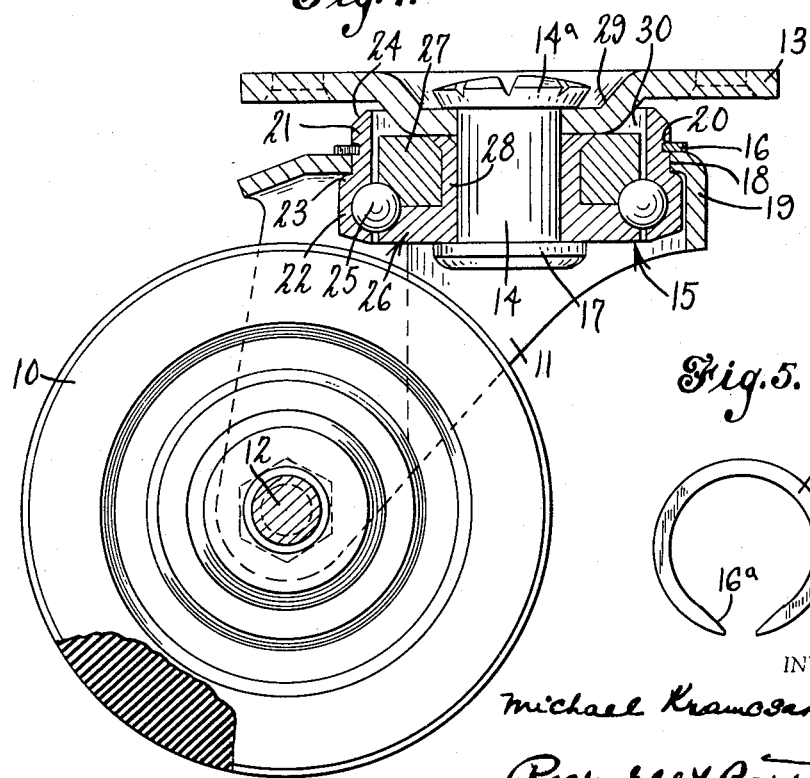
Fig. 4 is an enlarged section on line 4—4 of Fig. 2.
Figure 5:
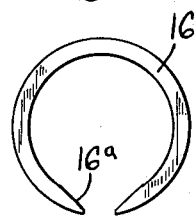
Fig. 5 is a detail of the snap ring which locks the bearing unit in the horn.

The upper end of the horn is flat for the most part, and in this flat portion is an aperture 18 into which the ball-bearing unit is introduced from a point below the horn top. At the rear of the horn and closely adjacent the aperture 18 the horn is provided with an integral depending wall portion 19 which acts to cover and conceal part of the rear portion of the ball-bearing unit. The snap ring 16 is open at one part of its circumference, as shown in Fig. 5, and is engaged with an annular groove 20 formed externally in the outer race member 21 of the bearing unit, the snap ring, when snapped into place, lying against the upper surface of the horn and holding the bearing unit in the assembled position. In this position an enlarged part 22 on member 21, providing a shoulder 23 (Figs. 4 and 6), abuts the under surface of the horn top so as to hold the bearing unit in place in the horn aperture, with the narrower part of the race member 21 projecting upwardly beyond the horn to a certain extent. For facilitating insertion of the bearing unit into the aperture 18 the upper end of the race member 21 is preferably beveled, as indicated at 24 (Figs. 4 and 6), and this beveled portion serves to center the unit and guide it into the assembled position. After the bearing unit has been placed in position in the horn aperture, the snap ring 16 is placed in position to lock the bearing in the horn, and in placing the snap ring in position it is slipped over the outer race member from above, snapping into place when it reaches the groove 20. The placing of the snap ring in locking position is facilitated by the engagement of the ring with the beveled portion 24 of the outer race.

The balls of the ball bearing are indicated at 25, and these are engaged with an annular groove in the race member 21 and with a second annular groove formed partly in a race member 26 and partly in a race member 27, the members 26 and 27 forming together a composite inner race member. As best shown in Fig. 4, the member 26 is in the form of a disk having integral therewith an upstanding sleeve 28. The member 27 is supported upon the disk part or member 26 around the sleeve 28, and the shank of the center pin 14 is located in a bore provided partly in the sleeve and partly in the disk portion of member 26.

As will be noted from Fig. 4, the staked projection or enlargement 14$^a$ at the upper end of the center pin is disposed within a shallow recess 29 formed by dishing the central part of the sheet metal attaching plate, and this dished part of the plate is thus clamped firmly against the upper surface of the inner bearing member, and when the attaching plate and the horn are turned with respect to each other, the outer ball race partakes of the movement of the horn and the inner race of the movement of the attaching plate and center pin.

As will be observed from Fig. 4, the upper end of the outer ball race extends into close adjacency to the lower surface of the attaching plate in the planar portion of this plate, and the dished portion of the plate extends downwardly into and is received in a recess 30 provided between the upper surface of the inner race member and the upper extremity of the outer race member. In other words, this recess is provided by making the inner race member of less height than the outer race member. In the form shown, the extreme upper edge of the outer race member is at substantially the same level as the bottom of the dish or cup formed in the attaching plate. The dish or cup in the attaching plate formed by bending thereof preferably has a flat bottom with an upwardly sloping side wall. This sloping side wall, as shown in Fig. 4, overhangs the recess or mouth portion 30, and an advantage of this construction is that the attaching plate serves to prevent dust or dirt entering the space between the inner and outer race members, which dust or dirt would, if it reached the balls, injuriously affect the bearing.

The resilient snap ring 16 is a flat metal ring of rectangular cross section having edgewise engagement with the groove 20. In the assembled position of the parts, the lower boundary of the groove 20 is substantially flush with the upper surface of the horn top.

An important advantage of the present caster construction is that the ball bearing can be manufactured as a complete unit, with the races properly hardened and the balls assembled between the races before the bearing is placed in the horn top. A suitable method of assembly is shown in Figs. 7, 8 and 9. In Fig. 7 the bearing unit is shown at some distance below the aperture in the horn top, where it is ready to be pushed up into the aperture. The bearing being held by hand or otherwise in position in the aperture, with the shoulder of the outer race against the lower surface of the horn top, the snap ring is placed into locking position by moving it from the broken-line position of Fig. 8 to the position shown in full lines. The attaching plate can then be placed on top of the inner race member, as shown in Fig. 9, and the assembly completed by inserting the center pin into the bearing and into the attaching plate and staking the upper end of the center pin, as described above.

In locking the bearing in the horn by means of the ring 16, it is unnecessary to work to close tolerances because it is possible to place the ring in locking position even if it is not positioned in a precise manner with respect to the groove 20. To secure this result the ring and the groove may be suitably related to each other as by having the upper surface of the groove on a bevel or angle, as indicated at 20ª. The inner edge of the ring will engage this bevel as the ring, in being placed in position, contracts, and the ring will come to rest with its lower surface firmly engaged with the upper surface of the horn, and with the shoulder 23 firmly engaged with the lower surface of the horn. In this manner irregularities in the sizes and shapes of the parts will be compensated for in a satisfactory manner.

The snap ring 16 is one having the necessary spring action, and preferably the ends of the ring will normally be spaced apart and somewhat pointed, as shown at 16ª in Fig. 5.

When the attaching plate and center pin have been placed in the assembled position, the assembly consisting of the bearing, center pin and attaching plate, will be firmly held in position relatively to the horn by the snap ring engaging over the upper surface of the horn top.

The outer race member is generally of cylindrical shape, the lower part being enlarged in a radially outward direction to create the shoulder which abuts the lower face of the horn top, and the thinner upper part of the race extending upwardly beyond the inner race member to a considerable degree and having a radially outward cylindrical face leading to the beveled portion 24, the beveled portion extending upwardly and radially inwardly of the race member.

It is an important advantage of this caster structure that the ball bearing can be made and its parts assembled in a precise and accurate manner before the bearing is assembled with the parts of the caster. To connect the bearing unit with the horn top, it is merely necessary to move the bearing unit upwardly into position in the horn aperture and then lock it in place in the manner previously described. The process of assembly is most convenient and simple, and will be clear from the preceding description. The ball bearing can be made to very close tolerances, with the ball races fully and uniformly hardened so that there is optimum functioning of the bearing with minimum play in the swivel of the caster. Operations heretofore necessary of introducing the balls between the races during the assembly of the caster parts are eliminated, and this contributes a great improvement to the manufacture of the caster.

By the present invention all of the difficulties and drawbacks incident to the swaging of the outer ball race for the purpose of fastening it in the horn are overcome. In the past it has been considered necessary in some cases in attaching the outer ball race to the horn to employ a swaging operation for turning the upper end of the outer ball race outwardly over the horn top, after which, when the race was in position in the horn top, the structure would be heat treated for hardening the ball race, which could not be hardened before the swaging operation. Hardening the ball race when it was installed in the horn top was a difficult operation, and, owing to the interconnection of the horn top and ball race, there was apt to be substantial distortion from the hardening treatment, and for these reasons the bearing could not be made to close tolerances. These disadvantages are overcome by the present invention.

What I claim is:

1. In a caster, a horn having a caster wheel mounted in the lower part thereof, said horn having a top wall with a round aperture therein, a ball-bearing unit comprising inner and outer race members and interposed balls, the outer race member being a substantially cylindrical member having a laterally enlarged thicker lower part presenting an external upwardly facing shoulder abutting the lower face of said top wall and a thinner portion extending upwardly through said aperture and substantially beyond it, said thinner portion having an upper end beveled in an upward and inward direction, said cylindrical portion having in a location spaced downwardly from said beveled portion an external annular groove the lower boundary of which is substantially flush with the top surface of the horn, the inner race member of said unit having its upper end disposed at some distance below the upper extremity of the outer race so as to provide in the outer race an upper mouth portion or recess, said inner race member having a central opening from top to bottom to receive a center pin, a center pin having an integral head placed against the lower surface of the inner race member, and a shank extending upwardly beyond the upper surface of said member, an attaching plate having a hole through which said center-pin shank passes, said hole being provided in a downwardly dished portion of said attaching plate which lies against the upper surface of the inner race member, said downwardly dished portion of the attaching plate having an inclined wall leading to the main portion of the plate and in close adjacency and protective relationship with respect to the space between he ball races, the upper end of said center pin being staked against the upper surface of the plate in said dished portion so as to clamp the bearing unit in position between the plate and the lower head on the center pin, and a flat resilient snap ring of rectangular cross section having edgewise engagement in said annular groove of the outer race member and overlying the top surface of the horn and holding said ball-bearing unit and its associated parts in the above-indicated relationship to the horn.

2. In a caster, a horn having a caster wheel mounted in the lower part thereof and having a flat top wall provided with an aperture therein, and a flat resilient snap ring of rectangular cross section overlying the upper surface of the horn top and having edgewise engagement with an assembly located in part in said aperture, said assembly comprising a ball-bearing unit having inner and outer ball races with interposed balls, an upper attaching plate, and a center pin with an integral lower head and a staked-over upper end serving to clamp together the attaching plate and the ball-bearing unit, the outer ball race being of greater height than the inner race and thereby providing a recess or mouth in the upper end portion of the outer race and said attaching plate having a depressed dished portion through which said center pin passes engaged with the upper surface of the inner race member in said recess or mouth, the outer race member projecting substantially above the upper surface of the horn top, said outer race being provided with a shoulder engaging the lower surface of the horn top, and the radially outer surface of said outer race being provided with an annular groove with which said snap ring is engaged edgewise for securing said assembly in position relatively to the horn.

3. In a caster, a horn having a caster wheel mounted in the lower part thereof and having a flat top wall provided with a round aperture, an assembly located in part in said aperture comprising inner and outer ball races with interposed balls, an upper attaching plate, and a center pin with an integral lower head and a staked-over upper end serving to clamp the inner ball race to the attaching plate, the inner and outer ball races with their interposed balls being a preassembled unit having prehardened race members, the outer race member having a thicker lower part presenting an external upwardly facing shoulder abutting the lower face of the horn top wall and a thinner cylindrical portion extending upwardly through and substantially beyond said aperture, said cylindrical portion terminating in an upper edge which is beveled in an upward and inward direction, said cylindrical portion having in a location spaced downwardly from said beveled portion an external annular groove the lower boundary of which is substantially flush with the top surface of the horn, and a flat resilient snap ring having edgewise engagement in said groove and overlying the top surface of the horn to fix in place the ball-bearing unit and the other parts of said assembly, the beveling in an upward and inward direction of the upper end of the outer race member facilitating on the one hand the assembly movement in which the ball bearing is placed in the horn aperture, and on the other hand the spreading of the snap ring as it is moved over the upper end of the bearing toward its seated position.

4. In a caster, a horn having a caster wheel mounted in the lower part thereof and having a flat top wall provided with a round aperture, an assembly located in part in said aperture comprising a preassembled and prehardened unitary ball bearing comprising inner and outer ball races with interposed balls and as further parts of said assembly an upper attaching plate and a center pin passing through the inner race having headed ends securing said plate to the inner race of the ball bearing, the outer race of said ball bearing having a shoulder abutting the lower face of the top wall of the horn and having a thinner portion extending through and upwardly beyond said top wall and beyond the inner ball race and containing a downwardly dished portion of said attaching plate underlying the upper end of said center pin, said thinner portion being provided with an external annular groove adjacent the upper face of said top wall, and a flat resilient snap ring of rectangular cross section having edgewise engagement with said groove and overlying the top wall of the horn so as to fix said assembly in position relatively to the horn.

5. In a caster, a horn having a top wall with an aperture therein, a prefabricated and preassembled ball bearing in said aperture comprising inner and outer race members and interposed balls, the outer race member being of greater height than the inner race member and having a lower portion abutting said top wall at the lower surface of the latter and an upper portion in said aperture extending a substantial distance above the upper surface of said top wall, said upper portion being provided with an external annular groove adjacent the upper face of the horn top and spaced downwardly from the upper extremity of said outer race member, a flat resilient snap ring of rectangular cross section having edgewise engagement with said groove and overlying said top wall to hold said ball-bearing unit in place, an attaching plate for the caster having a downwardly dished central portion positioned against the inner race member within the upper end portion of the outer race member, said plate having other portions extending laterally beyond the upper end of the outer race member, and a center pin passing through the inner race member having a lower head underlying the inner race member and an upper end staked against the downwardly dished central portion of said plate to complete the assembly.

References Cited in the file of this patent

UNITED STATES PATENTS

| | | |
|---|---|---|
| 1,418,379 | Karle | June 6, 1922 |
| 1,424,028 | Noelting | July 25, 1922 |
| 1,815,062 | Herold | July 21, 1931 |
| 1,922,098 | Kilian | Aug. 15, 1933 |
| 2,052,524 | Baker | Aug. 25, 1936 |
| 2,509,081 | Bluth et al. | May 23, 1950 |
| 2,521,948 | Rice et al. | Sept. 12, 1950 |
| 2,536,819 | Lyman | Jan. 2, 1951 |

FOREIGN PATENTS

| | | |
|---|---|---|
| 561,606 | Great Britain | May 25, 1944 |

OTHER REFERENCES

Kilian Manufacturing Corp., Catalog Number 33, January 1933, of 107 N. Franklin Street, Syracuse, N. Y., pages 15 and 23.